US007023981B2

(12) United States Patent
Stephens et al.

(10) Patent No.: US 7,023,981 B2
(45) Date of Patent: Apr. 4, 2006

(54) METHOD AND APPARATUS FOR SIGNAL DETECTION

(75) Inventors: James Allen Stephens, Chandler, AZ (US); Lam Tak Wing, Kowloon (HK)

(73) Assignee: Freescale Semiconductor, Inc., Austin, TX (US)

( * ) Notice: Subject to any disclaimer, the term of this patent is extended or adjusted under 35 U.S.C. 154(b) by 993 days.

(21) Appl. No.: 10/041,336

(22) Filed: Jan. 8, 2002

(65) Prior Publication Data

US 2003/0128836 A1    Jul. 10, 2003

(51) Int. Cl.
*H04M 1/82*    (2006.01)
(52) U.S. Cl. ...................... 379/386; 708/312
(58) Field of Classification Search ............. 379/93.35, 379/142.08, 283, 386; 708/311–312
See application file for complete search history.

(56) References Cited

U.S. PATENT DOCUMENTS

| 4,782,523 A | * | 11/1988 | Galand et al. ............... 379/386 |
| 5,353,346 A | * | 10/1994 | Cox et al. .................... 379/386 |
| 5,862,212 A |   | 1/1999  | Mathews ...................... 379/386 |

\* cited by examiner

*Primary Examiner*—Daniel Swerdlow
(74) *Attorney, Agent, or Firm*—Charles W. Bethards

(57) ABSTRACT

A signal detector for detecting a signal having a first nominal frequency, F1 and a second nominal frequency F2, the signal intermixed with an interfering signal to form a composite signal, the signal detector including a first and a second band pass filter centered at F1 and F2 for filtering the composite signal to provide an F1 and F2 signal; a parameter estimator for determining an F1 and F2 period for the F1 and F2 signal for a sequence of frames and an average period shift (APS) for a current frame and a plurality of earlier frames; a metric calculator for calculating a metric that corresponds to the F1 and F2 period and the APS; and a decision processor for deciding whether the signal has been detected based in part on a comparison of the metric and a threshold.

28 Claims, 4 Drawing Sheets

TABLE 1: SNR METRIC CALCULATION

| SNR (dB) | SNR METRIC TWIST dB<2.0 | SNR METRIC TWIST dB>2.0 |
|---|---|---|
| >-2.0 | 6.0 | 5.0 |
| -2.0 TO -2.5 | 5.0 | 4.0 |
| -2.5 TO -3.0 | 4.0 | 3.0 |
| -3.0 TO -3.5 | 3.0 | 2.0 |
| -3.5 TO -4.0 | 2.0 | 1.0 |
| -4.0 TO -4.5 | 1.0 | 0.0 |
| -4.5 TO -11.0 | 0.0 | 0.0 |
| -11.0 TO -13.0 | -1.0 | -1.0 |
| -13.0 TO -15.0 | -2.0 | -2.0 |
| <-15 | -3.0 | -3.0 |

*FIG. 5A*

TABLE 2: TWIST METRIC CALCULATION

| TWIST dB | TWIST METRIC |
|---|---|
| <2.5 | 3.0 |
| 2.5 TO 3.5 | 2.0 |
| 3.5 TO 4.5 | 1.0 |
| >4.5 | 0.0 |

*FIG. 5B*

TABLE 3: POWER METRIC CALCULATION

| MIN (F1 PWR, F2 PWR) dBM | POWER METRIC |
|---|---|
| >-32 | 2.0 |
| -34 TO -32 | 1.0 |
| <-34 | 0.0 |

*FIG. 5C*

TABLE 4: PERIOD METRIC CALCULATION

| MAX (F1 PERIOD ERROR, F2 PERIOD ERROR) % ALLOWED ERROR | PERIOD METRIC |
|---|---|
| <25 | 2.0 |
| 25 TO 50 | 1.0 |
| >50 | 0.0 |

*FIG. 5D*

$$\text{APS METRIC} = \begin{cases} 36 & \text{IF APS} > 0.98 \\ 0 & \text{IF APS} < 0.92 \\ \left(\frac{36}{0.06}\right)(\text{APS} - 0.92) & \text{OTHERWISE} \end{cases}$$

*FIG. 5E*

METHOD AND APPARATUS FOR SIGNAL DETECTION

FIELD OF THE INVENTION

This invention relates in general to communication systems, and more specifically to a method and apparatus for detecting signals within such systems.

BACKGROUND OF THE INVENTION

Signal detectors and methods thereof are known. Signal detectors have been arranged to detect signals in the presence of an interfering signal with varying degrees of success. In most cases there is a fundamental tradeoff for these detectors between false positive and false negative errors. False positive errors is where the signal detector indicates the signal has been detected when no such signal was present and false negative errors is where the signal is actually present but is not detected. In many detectors the incidence of false negative errors can be improved but at the expense of false positive errors and vice-a-versa.

One particular example of a signal within an interfering signal is a Customer premises equipment (CPE) Alerting Signal (CAS) or CAS tone used by telephony local service providers for local loop signaling where customers have Caller ID on Call Waiting (CIDCW) service. The CAS tone is an 80 millisecond duration, in band, dual tone (2130 Hz, 2759 Hz), −22 dBm signal that is sent from a central office switch (CO) to a CPE that can detect the CAS tone in the presence of the interfering signal, namely speech, music, and the like. Generally when a customer is on the phone or off hook and a call for the subscriber comes in the CO mutes the line and sends a subscriber access signal (SAS) followed by the CAS signal. The CPE detects the CAS, mutes the local person and sends an acknowledge tone, specifically DTMF D. The CO detects this acknowledge tone and sends the Caller ID information for the waiting call. Thus if the CAS detector has a false positive error or false detection, often referred to as a talk off the users voice will be muted for approximately 500 milliseconds and conversely a false negative error or failure to detect the CAS tone, typically referred to as a talk down error the customer will not receive the expected caller ID information for the waiting call.

To encourage widespread adoption of CIDCW a rigorous standard for the performance of CAS detectors has been developed by Bellcore. Generally this standard requires a detection rate of 99.5% and limits false detections to <1 per 45 hours. Clearly a need exists for a high performance low complexity signal detectors and methods therein.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5A–FIG. 5D show look up tables for various metric values for use in the FIG. 3 block diagram; and FIG. 5E depicts an equation used for determining a metric value for use in the FIG. 3 block diagram.

DETAILED DESCRIPTION OF PREFERRED EMBODIMENT

In overview form the present disclosure concerns communications systems and more specifically signal detectors and methods thereof for use therein. More particularly various inventive concepts and principles that improve the performance and reduce the complexity and processing resources required by such methods and apparatus are discussed. The signal detecting systems and methods of particular interest are those that are arranged to detect a signal intermixed with an interfering signal, such as a CAS tone intermixed with voice signals as used by local loop providers to provide CIDCW services to customers.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
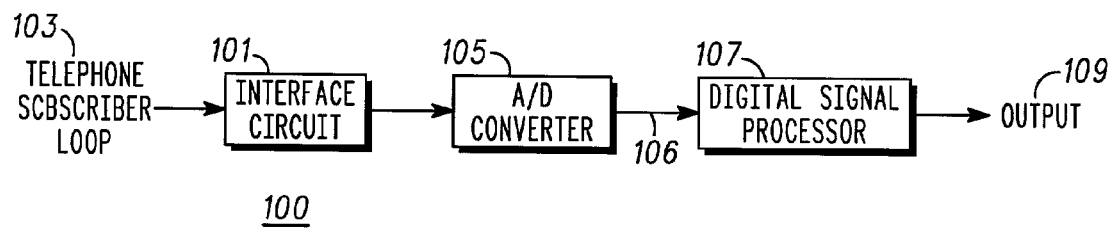
FIG. 1 depicts, in a simplified and representative form, a block diagram of a system suitable for utilization of various embodiments according to the invention.

Referring to the figures and specifically to FIG. 1 a simplified and representative block diagram of a system 100 suitable for utilization of various embodiments according to the invention will be reviewed. Included in this diagram is an interface circuit 101 that, preferably, provides a known interface suitable for terminating a telephone subscriber loop 103. The interface circuit 101 couples inbound signals from the local loop to an A/D converter 105 that generates digital samples at an 8 kHz sample rate. These can be low cost A/D converters common in telephony applications. These samples are provided at input 106 to a signal detector 107, preferably embodied or implemented within a digital signal processor (DSP) as shown. The DSP executes software to perform the below explained functions and algorithms to determine whether a CAS tone was included in the inbound signal from the CO. If so, a CAS tone detected signal is provided at output 109. A wide variety of DSP architectures including custom designs and programmable devices can be used. One example of a suitable DSP is the 56824, which is a low cost, fixed point, programmable DSP available from Motorola.

Figure 2:
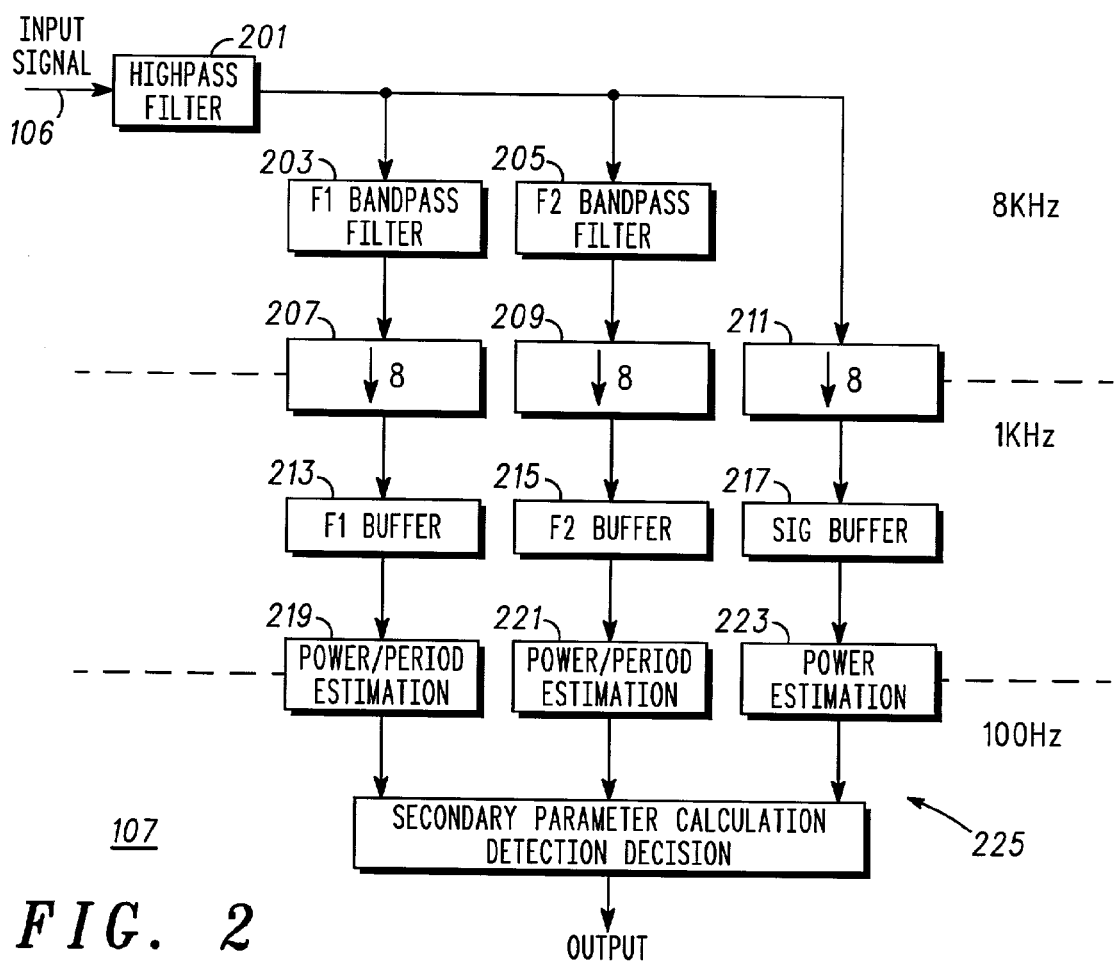
FIG. 2 depicts, in a representative form, a block diagram of a preferred embodiment of a signal detector according to the present invention.

Referring to FIG. 2 a block diagram of a preferred embodiment of the signal detector 107 will be reviewed. FIG. 2 demonstrates the top-level structure and the signal flow of the signal detector 107. The individual blocks shown in the figure can be grouped into three types of processing: front-end processing, parameter estimation, and detection decision. The front end processing consists of the filtering and decimation operations. This is followed by primary parameter estimation for each of the three signals generated by the front end processing. Then secondary parameters are calculated from the primary parameters. Finally, a detection decision is made based on the current and previous parameter estimates.

FIG. 2 also shows the multi-rate nature of the detector. The front-end filters process the 8 kHz input signal and their output signals are decimated by a factor of 8 down to a 1 kHz sample rate. The primary parameter estimation blocks operate on the 1 kHz data to generate estimates at a frame rate of 100 Hz or every 10 samples. Note that the frame size is 40 milliseconds or 40 samples so there is a 30 sample overlap between sequential frames. Then the secondary parameter calculations and detection decision logic run at the 100 Hz frame rate. This dual rate nature contributes to the relatively low processing resource requirements needed for this signal detector. An initial estimate indicates approximately 1.7 MIPS for a typical programmable DSP and about 420 words of data space is sufficient to implement a relatively sophisticated detector.

Figure 4A:
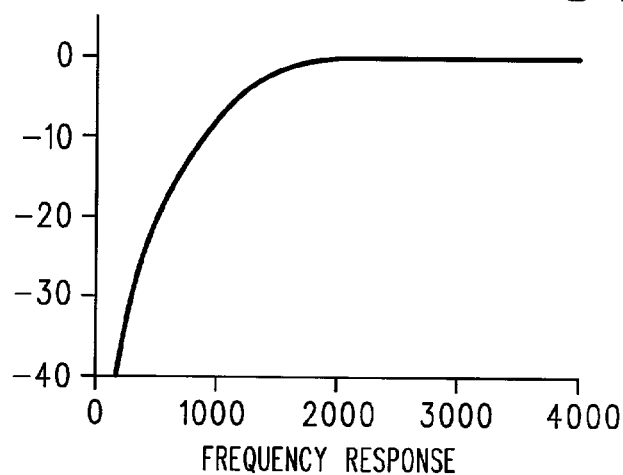
FIG. 4A–FIG. 4C show filter responses for the filters of FIG. 2.

The signal detector 107 is arranged to detect a signal having a first nominal frequency, F1, and, preferably, a second nominal frequency, F2, such as a CAS tone where F1=2130 Hz and F2=2750 Hz, where the signal is intermixed with an interfering signal, such as a voice or telephone line data to form an input signal at the input 106. The signal detector includes a high pass filter 201 that provides a filtered input signal or a composite signal. The high pass filter (HPF) provides isolation of the general band of interest (2 kHz–3 kHz) from low frequency interference such as some speech components. It also eliminates any DC bias from the input signal. The HPF is a second order Chebyshev type I filter with a pass band, shown in FIG. 4A, starting at 2 kHz and a pass band ripple no greater than 0.2 dB. This filter can be designed, as is known, using the MATLAB command shown in equation 1.

$$[\text{p6\_b\_hpf p6\_a\_hpf}] = \text{cheby1}(2, 0.2, 2000/4000, \text{'high'}). \tag{EQ 1}$$

Figure 4B:
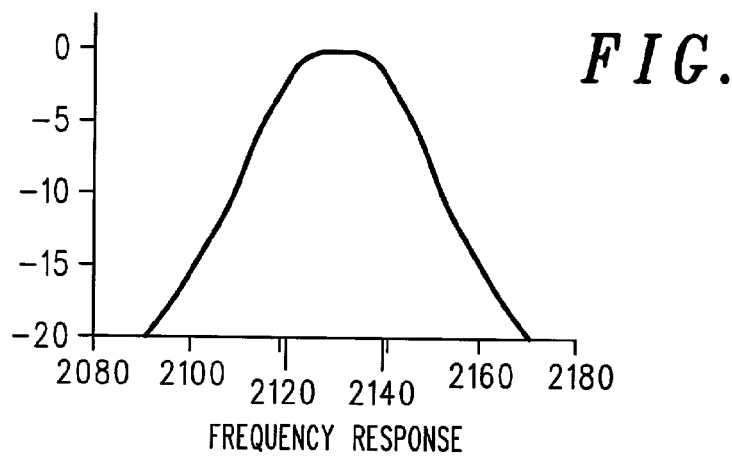

The composite signal or filtered input signal at the output of the high pass filter is input to or coupled to a first or F1 and a second or F2 band pass filter centered, respectively, at F1=2130 Hz and F2=2750 Hz. These filters are arranged and constructed for filtering the composite signal to provide filtered compositie signals or specifically an F1 signal and an F2 signal. The F1 band pass filter (F1 BPF) selects the low tone frequency (2130 Hz) and filters other frequency components. The F1 HPF is a fourth order Chebyshev type II filter with approximately a 24 Hz 3 dB passband, shown in FIG. 4B, and a minimum stopband attenuation of 45 dB. This filter can be designed, as is known, using the MATLAB command shown in the equation below.

$$[\text{b\_bpf\_f1\_8000, a\_bpf\_f1\_8000}] = \text{cheby2}(2, 45, [\text{f1}-120, \text{f1}+119]/4000). \tag{EQ2}$$

Figure 4C:
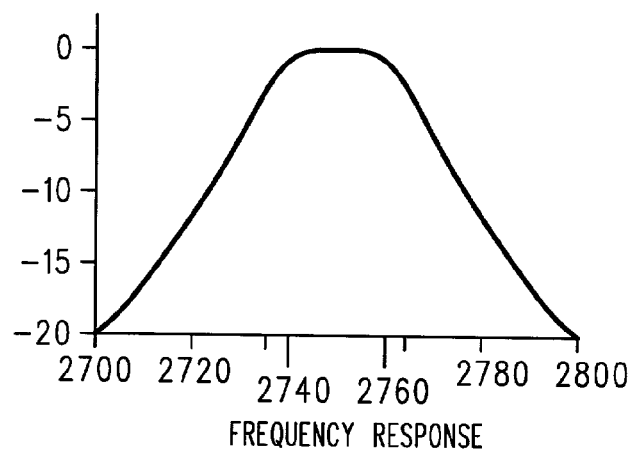

The F2 band pass filter (F2 BPF) selects the high tone frequency at 2750 Hz and filters other frequency components. The HPF is a fourth order Chebyshev type II filter with approximately a 30 Hz 3 dB passband, depicted in FIG. 4C, and a minimum stopband attenuation of 45 dB. This filter can be designed using the MATLAB command shown in the equation below.

$$[\text{b\_bpf\_f2\_8000, a\_bpf\_f2\_8000}] = \text{cheby2}(2, 45, [\text{f2}-160, \text{f2}+148]/4000). \tag{EQ3}$$

Each of the three signals (F1 signal, F2 signal and composite signal or sig.) generated by the front end filtering is decimated, as known, by a factor of 8 at, respectively, decimators 207, 209, 211. The decimation causes aliasing that must be accounted for in the period estimation of the F1 and F2 signals. The F1 center frequency is 2130 Hz. After decimation the F1 center frequency shifts to 130 Hz with a new sampling rate of 1 kHz, (given the input sample rate is 8 kHz). The F2 center frequency is 2750 Hz. After decimation the F2 center frequency shifts to 250 Hz with a new sampling rate of 1 kHz, (given the input sample rate is 8 kHz).

After decimation, each of the three signals (F1, F2 and sig) is buffered, according to known techniques, for further analysis at, respectively, F1 buffer 213, F2 buffer 215, and sig buffer 217. The buffers for these signals are sized to hold the 40 ms of data plus additional samples to compensate for delays through the bandpass filters. The F1 filter has a group delay of approximately 145 samples. After decimation this delay translates to about 18 samples. The F2 filter has a group delay of approximately 110 samples which translates to about 14 samples at the decimated rate. To completely compensate for the delay requires 18 additional samples of buffering. However in a preferred form, only 8 samples of compensation are used causing the signal power calculation to advance by 10 ms or one frame.

After buffering the F1 signal, F2 signal, and composite signal various primary parameters, such as power at 219, 221, and 223 and period at 219, 221 are estimated. This is followed by calulation of secondary parameters and then metrics all leading to arriving at a signal detection decision, output at 109, at the parameter estimation and detection decision block 225. The functions of the block 225 will be discussed in more detail below with reference to FIG. 3.

Figure 3:
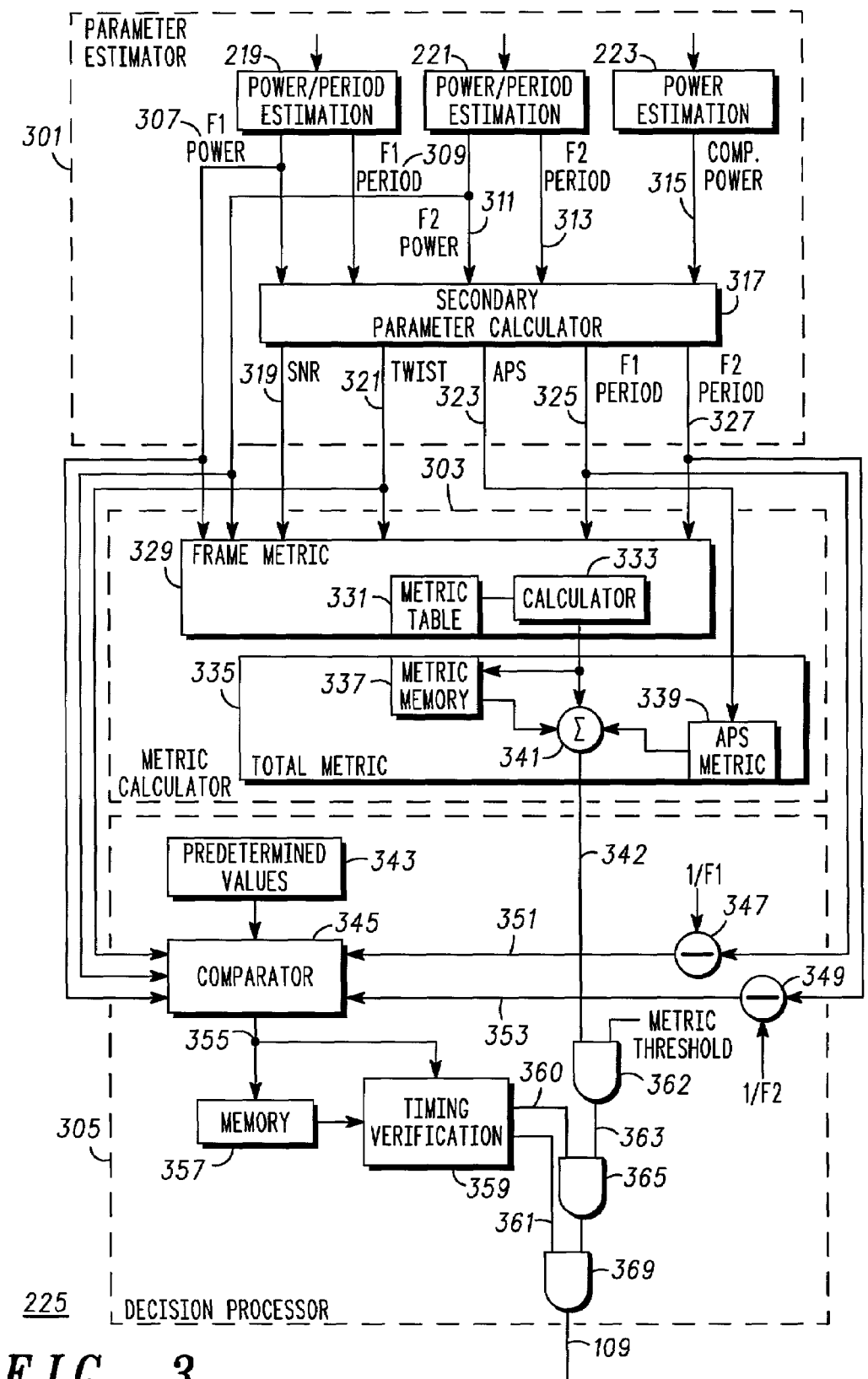
FIG. 3 illustrates a more detailed block diagram of a preferred embodiment of a portion of the FIG. 2 signal detector in accordance with the present invention.

FIG. 3 illustrates a more detailed block diagram of a preferred embodiment of the parameter, metric, decision block 225 of the FIG. 2 signal detector. Estimation, calculaton, and decision block 225 includes a paremter estimator function 301 that is coupled to the sgnals from buffers 213, 215, and 217 and operates to estimate five primary parameters, specifically a first filtered power or F1 power 307 and a first periodicity paremeter or F1 period 309 at power/period estimator 219 for the F1 signal or filtered composite signal, a second filtered power or F2 power 311 and a second periodicity parameter or F2 period 313 at power/period estmator 221 for the F2 signal or second filtered composite signal, and signal or composite power 315 at power estimator 223. These parameters are used directly by a metric calculator 303 and a decision processor 305 and are also used as the basis for calculation of a series of secondary parameters at secondary parameter calculator 317.

The power estimates are performed for each of a sequence of frames, specifically every frame time (10 ms), for the current power of the composite signal and the current power of the F1 and the F2 signals. Note as a result of the discussion above the current power of the signal is advanced by one frame time relative to the F1 and F2 signals. The power estimates are based on 40 ms of the respective signal which is windowed with a Hanning window. A generic energy calculation is performed as k times the sum, over 40 samples form n=0 to 39, of the squares of the product of the signal sample x(n) times the window sample value w(n). The scaling constant k in the power calculations can be chosen to be any convenient value consistent with power thresholds used for detection and metric calculation.

The periodicity parameter or period or current period for each of the filtered composite signals or F1 and F2 signal is determined or estimated for each of a sequence of frames, specifically every frame time (10 ms). To determine or estimate the period of a signal, first the autocorrelation sequence of the signal is calculated. Then the number of peaks in a region of the autocorrelation sequence is counted. If the number of peaks matches the expected value, the distance (in samples) between the first and last peak is estimated. The estimated period is this distance divided by the number of peaks minus one.

A 40 sample frame of a signal, x[n], is used to generate an autocorrelation sequence, xx[k] which equals the sum over n from 0 to 9 of the product x(n+k)x(15+n). The number of peaks and their approximate location in the autocorrelation sequence is determined by a simple peak search algorithm. A peak is declared if a sample in the sequence is positive and is greater than one of its immediate neighbors and greater than or equal to the other neighbor. After a peak is detected the search process skips a sample to avoid double counting a peak if two adjacent samples are equal. This algorithm provides the location of the peaks to the nearest sample. For accurate distance measurement this estimate is further refined by a fractional sample adjustment. The adjustment may be desired where as here the sample rate is low compared to the desired peak location resolution or desired accuracy for the period estimation. This adjustment to a peak located at sample k can be made by subtracting three from the ratio of the sum over n from −2 to +2 of the product $(n+3)xx_p(k+n)$, this sum divided by the sum over n from −2 to +2 of $xx_p(k+n)$ where $xx_p(n)=xx(n)$ for all xx(n)>0 and =0 otherwise. This equation will yield a value from −0.5 to +0.5 of a sample period or as here −/+½ millisecond.

To calculate the period of the F1 signal, the number of peaks between sample 5 and sample 25 of the signal's autocorrelation sequence are counted. If the number of peaks does not equal 3 then the F1 period is declared as 0. Otherwise the fractional adjustment is made to the first and last peak and the period is calculated as described previously. To calculate the period of the F2 signal, the number of peaks between sample 5 and sample 25 of the signal's autocorrelation sequence are counted. If the number of peaks does not equal 5 then the F2 period is declared as 0. Otherwise the fractional adjustment is made to the first and last peak and the period is calculated as noted above.

Using these three power estimates and two period estimates a number of secondary parameters are calculated at the secondary parameter calculator 317. An estimate of the signal to noise ratio (SNR), available at 319, is calculated by dividing the sum of F1 power and F2 power by a max sig power where max sig power is the maximum signal or composite signal power as calculated for the previous 3 frames. Since the composite signal is one frame ahead of the F1 and F2 signals, the previous 3 frames are equivalent to the previous frame, the current frame and the next frame. Since the tone frequencies are not filtered from the composite signal this equation is not a good estimator of SNR if the SNR is high (>0 dB). However, for this signal detector accurate SNR calculations are only needed in the case of low SNRs (<−2 dB).

Another secondary parameter is a Twist parameter, available at 321, that is calculated in dB units as 10 log the ratio of F1 power over F2 power. This parameter represents the difference in power between the high tone and the low tone. The remaining secondary parameter is called an Average Period Shift (APS) parameter, available at 323, which represents a variability estimate of the periodicity parameter or period estmates. The APS is proportional to a combination of a F1 min and a F1 max period selected from the F1 period for a current frame and a plurality of earlier frames and a F2 min and a F2 max period selected from the F2 period for the current frame and the plurality of earlier frames. A preferred calculation for APS is ½ the sum of the ratio of F1 min period over F1 max period and the ratio of F2 min period over F2 max period. The minimum and maximum values are taken from the set of period estimates in the current frame and 5 previous frames. This parameter represents how much the tone or nominal frequencies or specifically the estimates for the tone frequencies deviated during the detection period.

The filtered power or F1 power, second filtered power or F2 power, periodicity parameter or F1 period, second periodicity parmeter or F2 period and the secondary parameters, specifically, SNR which is a combination of F1 and F2 power and composite power, twist, and APS which is a variability estimate of the periodicity parameters are forwarded or coupled to the metric calculator 303. The metric calculator calculates a metric that corresponds to one or more of these 7 parameters or combinations thereof. This metric is then used in part by the decision processor 305 to decide whether the signal has been detected based on a comparison of the metric and a threshold.

More specifically for each frame (10 ms period), a metric is calculated which represents a probability that a CAS tone is being received for that frame. For this metric, larger values represent a higher probability that a CAS tone is being received. In a preferred form a frame metric calculator 329 calculates a metric or specifically a frame metric by summing four components namely a SNR metric, a twist metric, a power metric, and a period metric. A calculator 333 adds together components found in metric tables 331 using the values estimated or determined for the parameters or secondary parameters noted above. The SNR metric is found by looking up a value in Table 1 shown in FIG. 5A. For example with reference to FIG. 5A, if the SNR at 319 in dB was between −3.0 and −3.5 and the twist in dB was greater than 2.0 the SNR metric would be 2.0. Similarly with reference to FIG. 5B, Table 2, if the twist was <2.5 dB the twist metric would be 3.0. From Table 3, FIG. 5C, the power metric if the minimum of the F1 power and F2 power was >−32 would be 2.0. Referring to Table 4, FIG. 5D if the maximum period error of F1 and F2 as a percentage of allowed error (allowed error is equivalent to a 12.1 Hz shift from the center frequency of 2130 Hz for the F1 period and a 16.3 Hz shift from the center frequency of 2750 Hz for the F2 period) is <25% the period metric would be 2.0. The period error is defined as the difference between the estimated period and the nominal period. For example, 50% off the allowed error for 2130 Hz and 2750 Hz is, respectively, 6.05 Hz and 8.15 Hz or slightly over 1.3 microseconds and 1.07 microseconds of period error.

This frame metric is then forwarded to another part of the metric calculator 303, specifically a total metric calculator 335 and particularly a metric memory 337 and summer 341. The metric calculator, specifically total metric calculator 335 then calculates a total metric that is dependent on the metric for a current frame or portion and one or more earlier frames or portions of the signal and filtered signals. Specifically the total metric parameter is calculated by summing: the current frame metric, the previous 5 frames' metric, available from the memory 337, and the APS metric available from the APS metric calculator 339. Calculation of the APS metric is shown by the equation in FIG. 5E. If the APS is >0.98 the metric is 36, if the APS is <0.92 the APS metric is 0, and if the APS lies within 0.92–0.98 the APS metric linearly increase from 0 to 36 according to how close the APS is to 0.98. For example with an APS=0.95, the APS metric would be 18. The total metric is made available at 342 to decision processor 305.

Besides the total metric, the filtered power or F1 power and F1 period or periodicity parameter, the second filtered power or F2 power and F2 period or second periodicity parameter, and twist values as estimated or determined or calculated are coupled to the decision processor 305. At each frame time a detection decision is made by the decision processor, either a signal, preferably CAS signal, has been detected or not. Detection of a signal occurs in two stages, first a signal for the current frame is detected and then any timing contraints of the signal, such as duration, may be verified. If the timing of a signal is valid, a signal detection event is declared and an output indicative thereof is made available at 109. In the preferred form where a CAS signal is being detected errors are reduced by noting that a CAS signal has a nominal duration.

The detection of a potential CAS signal for a frame is based on the parameter values of the current and five previous frames. For a potential CAS signal to be declared two criteria must be met. One the current and previous fives frames must each be found to be valid as described below. When a frame is found to be valid that means that conditions or estimated parameters for that frame are consistent with the presence of the signal or as here the CAS signal for that frame. Two, the total metric must exceed a fixed threshold. Through experimentation a total metric threshold of 59 was chosen.

The decision processor in one embodiment decides whether a frame is valid, implying that conditions or parameters within that frame time are consistent with or at least not inconsistent with the signal or CAS signal or a potential CAS signal being present or having been detected in the current frame, by favorably comparing, at comparator 345, the F1 power and F1 period error, the F2 power and F2 period error, and the twist parameter, respectively, to a predetermined F1 power, a predetermined F2 power, a predetermined twist, a predetermined F1 period error, a predetermined F2 period error, the predetermined values stored at 343 and the F1 and F2 period errors available from 347 and 349, respectively. Specifically the current frame is declared valid if F1 power exceeds −36 dBm, F2 power exceeds −36 dBm, Twist dB is less than 7.0, F1 period error is less than 12.1 Hz, and F2 period error is less than 16.3 Hz. If these conditions are satisfied comparator 345 provides a valid frame signal at 355 and this together with the F1 and F2 power for that frame are stored in memory 357 and coupled to a timing verification block 359. At 359, when the current frame and a plurality of earlier frames, preferably 5 have been found to be valid (potential CAS signal deemed detected) a true signal is provided at 360 and coupled to AND gate 365. The total metric at 342 is compared to a metric threshold by comparator 362 and a true signal is made available at 363 and coupled to AND gate 365 when the metric threshold is exceeded. The output from the AND gate or function 365, representing a potential CAS signal detection, is coupled to AND gate 369.

The second output from the timing verification block 361 is also coupled to AND gate 369 and will be true when the duration of the potential CAS signal is within a range of frames, preferably more than five and not more than 14. The duration of the CAS signal is defined as a range of frames, specifically and inclusively, the frame after the last invalid frame up until the frame prior to a frame where either F1 or F2 power has decreased by 6 dB from the level when the potential CAS signal was detected. This tests whether the signal has exceeded an expected number of frames in duration. For example for a CAS signal detection to be declared or for the timing to be verified, the duration of a CAS signal must not exceed a fixed threshold. The threshold has been set to 14 frame times which allows for CAS signals as long as 125 ms. Longer signals are rejected which enhances the talkoff performance of the signal detector. If there are 14 or fewer total frames of a potential CAS signal, including the first and the last, a CAS signal detection event is declared. The decision processor 305 provides a signal detected output at 109 when the signal has been detected in the current frame and a predetermined number of earlier portions or range of earlier frames, specifically 5 and not more than 14, preferably as above noted.

As a review the signal detector discussed above is preferably implemented in large part in a processor such as digital signal processor and operates to process a sampled data version of the composite signal. In general terms an apparatus and a method of detecting a signal having a nominal frequency and in a preferred CAS signal form a second nominal frequency where the signal is intermixed with an interfering signal, such as voice to form a composite signal. The method includes filtering the composite signal with a filter centered at the nominal frequency to provide a filtered composite signal; estimating a filtered power for the filtered composite signal and a composite power for the composite signal; determining a periodicity parameter, such as a period of the filtered composite signal and a variability estimate, such as period error or range of period estimates, of the periodicity parameter; calculating a metric that corresponds to a combination of the filtered power, the composite power, the periodicity parameter, and the variability estimate; and then deciding whether the signal has been detected based in part on a comparison of the metric and a threshold.

The steps of estimating, determining, calculating, and deciding are performed repeatedly on sequential portions of the composite signal and the filtered composite signal. The step of calculating a metric further includes calculating a total metric that is dependent on the metric for a current portion and one or more earlier portions of the composite signal and the filtered composite signal. The process of deciding further includes deciding whether the signal has been detected in the current portion by favorably comparing the filtered power, the periodicity parameter, and the total metric, respectively, to a predetermined filtered value, a predetermined periodicity value, and a metric threshold. Deciding includes deciding that the signal has been detected when the signal has been detected in the current portion and a predetermined number of earlier portions, preferably not exceeding a second threshold selected according to expectations for the duration of the signal.

When the signal includes a second nominal frequency such as a CAS signal filtering includes filtering the composite signal with a second filter centered at the second nominal frequency to provide a second filtered composite signal; estimating includes estimating a second filtered power for the second filtered composite signal; determining or estimating includes determining a second periodicity parameter of the second filtered composite signal and a second variability estimate of the second periodicity parameter; calculating includes calculating a metric that corresponds to a combination of the filtered power, the second filtered power, the composite power, the periodicity parameter, the second periodicity parameter, and the variability estimate, where, preferably, the variability estimate is proportional to a combination of maximum and minimum periodicity parameters and second periodicity parameters selected from such parameters over a plurality of the portions or frames.

A software program is one embodiment according to the present invention. This software program may be stored or copied onto or carried by any form of media including diskette or CD or DVD and includes instructions preferably in machine or assembly language which when executed or compiled and executed on a processor such as a digital signal processor will cause the processor to operate to perform the functions of a signal detector as above described.

The processes, discussed above, and the inventive principles thereof are intended to and will alleviate false positive and false negative problems caused by prior art signal detectors. Using these principles of signal detection has shown a simple and processing resource efficient signal detector whose performance meets and exceeds the industry standards for CAS tone detectors.

Various embodiments of methods, systems, and apparatus for signal detection in an efficient and timely manner have been discussed and described. It is expected that these embodiments or others in accordance with the present invention will have application to many signal detectors although it is recognized that many of the parameters that have been disclosed were experimentally determined and will need to be determined once again as parameters of the signal being detected are modified. The disclosure extends to the constituent elements or equipment comprising such systems and specifically the methods employed thereby and therein. Using the inventive principles and concepts disclosed herein advantageously allows or provides for reliable signal detection, particularly of CAS signals which will be beneficial to users and providers a like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof.

What is claimed is:

1. A method of detecting a signal having a nominal frequency, the signal intermixed with an interfering signal to form a composite signal, the method including the steps of:
   filtering the composite signal with a filter centered at the nominal frequency to provide a filtered composite signal;
   estimating a filtered power for said filtered composite signal and a composite power for the composite signal;
   determining a periodicity parameter of said filtered composite signal and a variability estimate of said periodicity parameter;
   calculating a metric that corresponds to a combination of said filtered power, said composite power, said periodicity parameter, and said variability estimate; and
   deciding whether the signal has been detected based in part on a comparison of said metric and a threshold.

2. The method of claim 1 wherein said steps of estimating, determining, calculating, and deciding are performed repeatedly on sequential portions of said composite signal and said filtered composite signal.

3. The method of claim 2 further including calculating a total metric that is dependent on said metric for a current portion and one or more earlier portions of said composite signal and said filtered composite signal.

4. The method of claim 3 wherein said step of deciding further includes a step of deciding whether the signal has been detected in the current portion by favorably comparing said filtered power, said periodicity parameter, and said total metric, respectively, to a predetermined filtered value, a predetermined periodicity value, and a metric threshold.

5. The method of claim 4 wherein said step of deciding further includes deciding that said signal has been detected when said signal has been detected in said current portion and a predetermined number of earlier portions.

6. The method of claim 2 wherein the signal further includes a second nominal frequency and:
   said step of filtering includes filtering the composite signal with a second filter centered at the second nominal frequency to provide a second filtered composite signal;
   said step of estimating includes estimating a second filtered power for said second filtered composite signal;
   said step of determining includes determining a second periodicity parameter of said second filtered composite signal and a second variability estimate of said second periodicity parameter;
   said step of calculating includes calculating a metric that corresponds to a combination of said filtered power, said second filtered power, said composite power, said periodicity parameter, said second periodicity parameter, and said variability estimate, and
   where said variability estimate is proportional to a combination of maximum and minimum periodicity parameters and second periodicity parameters selected from such parameters over a plurality of said portions.

7. A signal detector for detecting a signal having a first nominal frequency, F1 and a second nominal frequency F2, the signal intermixed with an interfering signal to form a composite signal, the signal detector comprising in combination:
   a first and a second band pass filter centered at F1 and F2 for filtering the composite signal to provide an F1 signal and an F2 signal;
   a parameter estimator for determining an F1 period for said F1 signal and an F2 period for said F2 signal for each of a sequence of frames of said F1 signal and said F2 signal and an average period shift (APS) that is proportional to a combination of a F1 min and a F1 max period selected from said F1 period for a current frame and a plurality of earlier frames and a F2 min and a F2 max period selected from said F2 period for said current frame and said plurality of earlier frames;
   a metric calculator for calculating a metric that corresponds to said F1 period, said F2 period, and said APS; and
   a decision processor for deciding whether the signal has been detected based in part on a comparison of said metric and a threshold.

8. The signal detector of claim 7 wherein said metric calculator calculates a total metric that is dependent on said metric for a current frame and one or more earlier frames.

9. The signal detector of claim 8 wherein said decision processor further decides whether the signal has been detected in said current frame by favorably comparing said F1 period, said F2 period, and said total metric, respectively, to a predetermined F1 period value, a predetermined F2 period value, and a metric threshold.

10. The signal detector of claim 7 wherein said decision processor provides a signal detected output when said signal has been detected in said current frame and a predetermined range of earlier frames.

11. The signal detector of claim 7 implemented in part in a processor to process a sampled data version of said composite signal.

12. The signal detector of claim 7 wherein said parameter estimator further determines, for said each of said sequence of frames, an F1 power, an F2 power, and a composite power for, respectively, said F1 signal, said F2 signal, and the composite signal.

13. The signal detector of claim 12 wherein said parameter estimator further determines:
  a signal to noise ratio (SNR) corresponding to said F1 power, said F2 power, and said composite power;
  a twist corresponding to a ratio of F1 power and F2 power; and
  said APS that is proportional to a ratio of said F1 min and said F1 max period and a ratio of said F2 min and said F2 max periods.

14. The signal detector of claim 13 wherein said metric calculator calculates a frame metric corresponding to said SNR, said twist, said F1 power and said F2 power, and a F1 period error and a F2 period error.

15. The signal detector of claim 14 wherein said metric calculator calculates a total metric that includes said frame metric for said current frame and said plurality of earlier frames and said APS.

16. The signal detector of claim 15 wherein said decision processor further decides whether the signal has been detected in said current frame by favorably comparing said F1 power, said F2 power, said twist, said F1 period error, said F2 period error, and said total metric to, respectively, a predetermined F1 power, a predetermined F2 power, a predetermined twist, a predetermined F1 period error, a predetermined F2 period error, and a metric threshold.

17. The signal detector of claim 16 wherein said decision processor provides a signal detected output when said signal has been detected in said current fame and a predetermined range of earlier frames.

18. A software program that enables a signal detector for detecting a signal having a first nominal frequency, F1 and a second nominal frequency F2, the signal intermixed with an interfering signal to form a composite signal, the software program, when installed on and executed by a processor that is suitably interfaced to the composite signal, providing in combination:
  a first and a second bandpass filter centered at F1 and F2 for filtering the composite signal to provide an F1 signal and an F2 signal;
  a parameter estimator for determining an F1 period for said F1 signal and an F2 period for said F2 signal for each of a sequence of frames of said F1 signal and said F2 signal and an average period shift (APS) that is proportional to a combination of a F1 min and a F1 max period selected from said F1 period for a current frame and a plurality of earlier frames and a F2 min and a F2 max period selected from said F2 period for said current frame and said plurality of earlier frames;
  a metric calculator for calculating a metric that corresponds to said F1 period, said F2 period, and, said APS; and
  a decision processor for deciding whether the signal has been detected based in part on a comparison of said metric and a threshold.

19. The software program of claim 18 wherein said metric calculator calculates a total metric that is dependent on said metric for a current frame and one or more earlier frames.

20. The software program of claim 19 wherein said decision processor further decides whether the signal has been detected in said current frame by favorably comparing said F1 period, said F2 period, and said total metric, respectively, to a predetermined F1 period value, a predetermined F2 period value, and a metric threshold.

21. The software program of claim 18 wherein said decision processor provides a signal detected output when said signal has been detected in said current frame and a predetermined range of earlier frames.

22. The software program of claim 18 installed on and executed by a digital signal processor to process a sampled data version of said composite signal.

23. The software program of claim 18 wherein said parameter estimator further determines, for said each of said sequence of frames, an F1 power, an F2 power, and a composite power for, respectively, said F1 signal, said F2 signal, and the composite signal.

24. The software program of claim 23 wherein said parameter estimator further determines:
  a signal to noise ratio (SNR) corresponding to said F1 power, said F2 power, and said composite power;
  a twist corresponding to a ratio of F1 power and F2 power; and
  said APS that is proportional to a ratio of said F1 min and said F1 max period and a ratio of said F2 min and said F2 max periods.

25. The software program of claim 24 wherein said metric calculator calculates a frame metric corresponding to said SNR, said twist, said F1 power and said F2 power, and a F1 period error and a F2 period error.

26. The software program of claim 25 wherein said metric calculator calculates a total metric that includes said frame metric for said current frame and said plurality of earlier frames and said APS.

27. The software program of claim 26 wherein said decision processor further decides whether the signal has been detected in said current frame by favorably comparing said F1 power, said F2 power, said twist, said F1 period error, said F2 period error, and said total metric to, respectively, a predetermined F1 power, a predetermined F2 power, a predetermined twist, a predetermined F1 period error, a predetermined F2 period error, and a metric threshold.

28. The software program of claim 27 wherein said decision processor provides a signal detected output when said signal has been detected in said current fame and a predetermined range of earlier frames.

* * * * *

UNITED STATES PATENT AND TRADEMARK OFFICE
CERTIFICATE OF CORRECTION

| | | |
|---|---|---|
| PATENT NO. | : 7,023,981 B2 | Page 1 of 1 |
| APPLICATION NO. | : 10/041336 | |
| DATED | : April 4, 2006 | |
| INVENTOR(S) | : James A Stephens | |

It is certified that error appears in the above-identified patent and that said Letters Patent is hereby corrected as shown below:

In Column 12, Line 59, Claim No. 28:
    Change "detected in said current fame and a" to --detected in said current and a--

Signed and Sealed this

Twenty-second Day of July, 2008

JON W. DUDAS
*Director of the United States Patent and Trademark Office*